May 24, 1932.　　　　　K. SLIDELL　　　　　1,859,539
CELLULAR BUILDING MATERIAL
Filed July 31, 1929
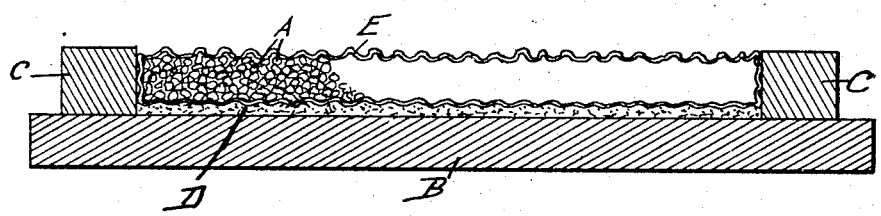
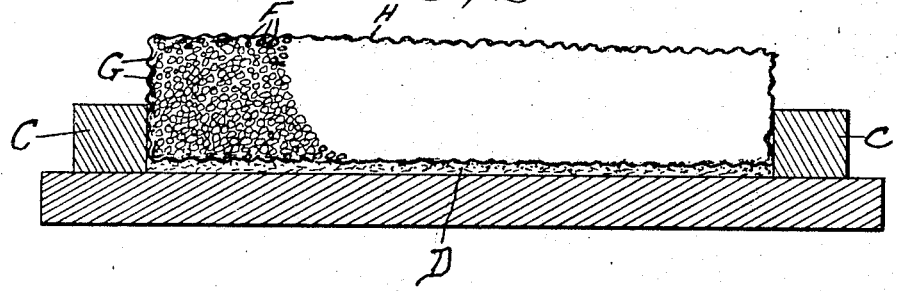
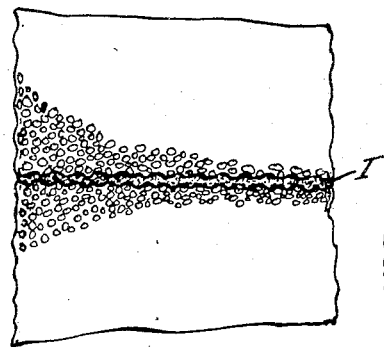　　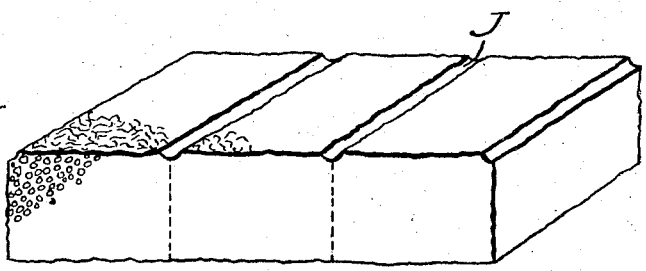
Witness:
William P. Kilroy
Inventor:
Kemper Slidell
By Samuel W. Banning
Atty Patented May 24, 1932

1,859,539

UNITED STATES PATENT OFFICE

KEMPER SLIDELL, OF MADISON, WISCONSIN, ASSIGNOR, BY MESNE ASSIGNMENTS, TO AMERICAN FACE BRICK RESEARCH CORPORATION, A CORPORATION OF ILLINOIS

CELLULAR BUILDING MATERIAL

Application filed July 31, 1929. Serial No. 382,358.

This invention consists of a new article of manufacture, made from clay or other argillaceous material, and formed into building units and other articles of manufacture.

An object of this invention is to make an unusually light building unit. It possesses such qualities as economy of raw materials, saving of transportation costs, high speed in erection, superior insulation against heat and cold, and imperviousness to moisture.

This new material is made of such ingredients as brick are ordinarily made of, that is, clays and shales. The first step of manufacture is to grind or otherwise break the clay up as is ordinarily done in the manufacture of bricks. It is then given a preliminary heating in a rotary or other type of agitating furnace, and heated until it is slightly below the fusing stage, at which it still retains its granular condition. It is then transferred to a non-agitating furnace or heating chamber and is quiescently heated to a temperature at which it fuses and puffs. It is then slowly cooled, or annealed, and finally cut into the desired shape, if smaller units are desired.

This new material is very light, so much so that it readily floats in water. It is cellular and in structure very much like that of baked bread, the cell walls being of fused or vitreous material. It is strong enough for supporting walls of buildings and is non-absorptive of moisture.

Almost any argillaceous material is suitable for making this material. The purer fire clays may be so difficult to fuse as to be impracticable for use, but most clays and shales will make this material. Carbon, sulphur and iron are constituents of clay that contribute to or are perhaps essential to making a clay capable of being bloated.

The drawings illustrate more or less diagrammatically the condition of the material during the various stages of the process, together with diagrammatic representation of so much of the kiln in which the material is bloated as is necessary to an understanding of the process and the nature of the product resulting therefrom.

Figure 1 is a view showing a pile of the granular material in its original broken up or disintegrated condition;

Fig. 2 is a view showing the condition of a charge of material after it has formed a fused surface skin or layer;

Fig. 3 is a view showing the final condition of the material after it has been completely bloated;

Fig. 4 is a view showing two blocks of the material bonded together; and

Fig. 5 is a perspective, showing the method of grooving the slab to afford beveled edges in the cut blocks.

The material is ground or otherwise broken up into granules or particles A to a fineness approximately suitable for brick making, as indicated in Fig. 1. I have found that by breaking it up so that it will go through a one-sixth inch mesh produces a suitable granular mass for future treatment, although I do not limit the raw material to this degree of fineness. I preferably grind it dry and in some type of grinder used for grinding brick clays or shales.

The ground material is placed in some type of agitating kiln where it is rapidly heated to a temperature of from 1500° to 1800° F., the object being to heat to the highest practicable temperature at which the granular condition of the material will be preserved without fusion. I have found a rotary type kiln very suitable for this purpose, but do not limit myself to the use of this type of kiln. The purpose of this heating is to dry and uniformly heat the material without fusing it. As the material nears the temperature above stated, it first begins to give off internally created gases, and then, if continued above this, becomes sticky. These gases have an affinity for oxygen, so that to prevent the giving off of too much of these gases, I find it advantageous to heat the material in an atmosphere as nearly devoid of oxygen as possible.

While still in the granular stage, the material is transferred to some type of kiln in which the material can be quiescently heated to a higher temperature. The temperature is for most material run up to 2000° or 2300° F. I have found a stationary semi-muffle type of furnace quite satisfactory for this purpose. A refractory slab B is utilized on which to deposit the material. This slab is supported above the floor of the furnace so that the heat can reach the material both from above and below. I find it advantageous to transfer the material from the agitating kiln to the quiescent kiln by gravity.

The material is leveled, or if desired is spread between side forms C over the refractory slab of the quiescent kiln directly on top of a thin layer D of sand, or other material that will keep it from sticking to the slab. The side forms may be of metal which will scale under heat, the scale parting from the metal body, or carborundum or other refractory material coated with sand, graphite or the like, may be used, or strips of the present product, which will fuse onto the mass under treatment and may be removed therewith and thereafter trimmed from the completed block and again used as forms in succeeding operations. This anti-sticking medium should be of some material that will part in itself, unless some cheap or waste product can be used such as side trimmings mentioned. I find that in addition to sand and gravel, talc can be used. After the material is placed on the bed of anti-sticking material, the material is leveled or struck off to a uniform depth, as in Fig. 2. This is done so that the heat will penetrate the material uniformly throughout the mass, and give the product a more uniform thickness.

The first action of the heat when the material is subjected to this higher temperature is to fuse the surface particles so that they flow together and form a vitrified sealing skin E. This skin imprisons in the material a part of the air that is between the particles. As the heat penetrates beyond the skin it fuses or welds the particles together, expands the imprisoned air, and liberates heat-generated gases within the material. These gases are formed by gas-producing substances such as sulphur, carbon and the like found in the material. This expanded air and liberated gas forms non-communicating or separate and closed bubbles or cells throughout the fused or vitrified mass, so that it has very much the structure of yeast-leavened dough, the cell walls being of vitrified material and the identity of the original granules or particles having disappeared in the general liquefaction and bloating of the entire mass.

During the bloating stage, the material expands and puffs to from two to three times its original volume, as indicated in Fig. 3. I have found that material preheated to 1800°, when placed in the bloating temperature, bloats to a suitable degree when heated from ten to fifteen minutes for each inch of original thickness, so that a two inch bed of material will bloat to four times in twenty to thirty minutes.

In most cases the material will bloat to the desired level without rolling, but if a particularly level surface or a uniform thickness of the bloated material is desired, we may roll the top while it is hot.

To keep the material from sticking to the roller, I use a roller that is much cooler than the hot clay or sprinkle the top surface with sand or other parting material; and for most purposes the material will be bloated while in the form of a column having parallel top and bottom surfaces either for use as a completed block or slab of that form or to facilitate cutting to smaller blocks or slabs without excessive waste. For some purposes we can deform the slabs by top and bottom rollers, as, for instance, in making some forms of roofing tile.

A continuous slab or column of indefinite length can be produced if desired by introducing the material continuously or in charges and fusing new material to that previously bloated, the completed portion of the slab being moved forwardly from time to time to make way within the furnace for incoming charges of material.

When cool, the material retains its cellular structure and becomes solid and somewhat brittle. If it is cooled rapidly, it shatters from the strains of contraction; therefore, I find that it is necessary to cool the material quite slowly to counteract this self-destructive tendency. It can be quickly cooled down to a cherry color without injury, but below this stage it must be cooled very slowly. I find that with the clays I have used, a four inch slab requires about three hours to reduce to a handling temperature.

Although for some purposes the block or slab may be used in the form in which it comes from the furnace and presenting the pebbled top surface texture characteristic of this material before cutting, it will be found that for many purposes it is necessary to cut the material into shapes. For bricks, building blocks, roofing tile, roofing slabs, etc., I cut the slab as it comes from the furnace, by means of abrasive wheels, or other cutting devices. For accurately shaped units, I grind the top and bottom surfaces, but for most units, these surfaces, more or less pebbled or rough, can be left just as they come from the kiln, since the pebbling presents an attractive texture especially desirable when the material is used for exterior wall building purposes.

This material has a highly cellular structure. The cells F are spherical, and preferably none are over one-eighth of an inch in diameter, and are separated by continuous cell walls G of vitrified material. Interspersed with larger cells will be finer ones, some so fine as to be invisible to the eye.

Its weight varies with the degree of puffing to which it is subjected, but I find in general that the material which has been bloated so as to have a weight of 35 to 40 pounds per cubic foot is entirely suitable for building materials. When great strength is required, the weight may be increased to 50 pounds per cubic foot, and when little strength but great thermal resistance is needed the weight may be as low as 20 pounds per cubic foot. Its compressive strength varies with the temperature control and atmosphere control exercised in preheating and bloating, and also with the care with which it has been annealed. Samples which I have tested range from 630 to 2690 pounds per square inch. I find that about 1500 pounds per square inch is the average for the material we make into building units.

The material is practically impervious to moisture even when subjected to considerable hydrostatic pressure, due to the fact that the vitrified cell walls extend continuously and afford no inter-connecting pores or crevices for the passage of water. The material is easily penetrated by nails. It can be cut with a metal saw, as well as by an abrasive wheel.

The cut surfaces are usually of a grayish purple, but may have areas tinged with tans, greens, purple, and other colors, depending upon the constituents of the raw materials, or materials purposely added in order to secure the desired colors.

The cut surface may, if desired, be exposed to a flame containing oxygen, which will color them to the shade approximating those to which the same material burns in a brick. The exterior upper surfaces H, which have not been cut, have approximately the color of brick burned from the same material, under like oxydizing or reducing conditions, and present a rough and pebbled appearance and texture, owing to the irregular protrusion of the original particles. The outer skin, however, extends continuously, due to the fusing of the particles together, and the under surface and side surfaces which have had contact with the side form or with the parting material are likewise roughened, but to a lesser degree than the top.

This product is suitable for many uses as a building material. One preferred use of it is to cut it directly into building bricks, blocks, roofing slabs, etc. It can be formed into roofing tile. Large thin blocks of it can be used in fireproof floor construction for "voids" between concrete beams. Defective units, or for that matter the product itself, can be broken up or crushed, as is rock, into concrete aggregate.

The cut surfaces present true planes cutting through the cells and presenting open pockets which serve to receive and hold the bonding material, which may be a thin layer I of neat cement or other adhesive bonding material, which fills the exposed cell pockets and at the same time permits the cut surfaces of contiguous blocks to lie in practical contact with one another so as to prevent the external appearance of continuity. This enables the bonding material to be thinly spread with a brush, and obviates the use of a trowel and a thick layer of mortar, since the blocks themselves are accurately fitted together, as indicated in Fig. 4.

In Fig. 5, I have indicated the formation of a slab of material provided with grooves or channels J formed in the upper or pebbled surface, which are desirable where it is intended to cut the slab into sections or blocks resembling bricks, and where beveled edges are desirable for purposes of simulating brickwork, either by reason of the beveled formation or by the provisions of lines of cement in simulation of mortar joints. The grooves furnish cutting lines, so that by thus cutting the slab into sections, each section will afford beveled edges for the purpose stated.

In claiming the product of the present invention, I have referred to it as a building unit, although it is not thereby intended to limit its use strictly to its inclusion as an element within the walls or other structural constituents of a house or other building. Moreover, in referring to it as a unit, I have in mind the fact that it is produced in a form or shape, and of suitable dimensions, to permit it to be advantageously used, either as a block or slab in the form in which it comes from the furnace, or in a smaller form obtained by cutting or otherwise dividing the original slab.

It is therefore desirable to so regulate the process as to insure the production of blocks or slabs, as nearly as possible homogeneous in structure throughout, and of a size and form, usually rectangular, which will permit the original slab either to be used in that form or to be advantageously cut up into blocks of uniform size and shape.

The product therefore is to be distinguished from lumps or fragments of burned argillaceous material of indiscriminate shape which are intended only for the production, by crushing, of an aggregate adapted for use with cement in the production of concrete blocks or structures.

As compared with such aggregate forming masses, the present invention is distinguished by the relative smallness and uniformity of the cellular structure, by the complete fusion and unification of the original granules or particles into a continuous mass, and by the absence of cracks, crevices or lines of cleavage due to imperfect unification of the raw materials into the cellular structure of the completed product.

Furthermore, in aggregate forming products of the character mentioned, it is desirable, after bloating, to subject the material to a sudden cooling by immersion in water or spraying with water, in order to promote cracking or disintegration of the larger masses, so as to facilitate the final crushing of the material into aggregate form; while in the present invention, such a treatment would, of course, destroy the value of the product, which is tempered in order to prevent disintegration which in the former case is deemed desirable.

I claim:

1. As a new article of manufacture, a building unit of cellular vitrified argillaceous material of substantially uniform composition throughout and of predetermined shape and dimensions, and characterized by the inclusion throughout its body of separate and closed cells separated by cell walls of vitrified material.

2. As a new article of manufacture, a building unit of cellular vitrified argillaceous material, and characterized by the inclusion throughout its body of cells separated by cell walls of vitrified material, and having on at least one surface a continuous surface film of vitrified material of pebbled or recurrently protuberant configuration.

3. As a new article of manufacture, a building unit of cellular vitrified argillaceous material of predetermined shape and dimensions, and characterized by the inclusion throughout its body of cells separated by cell walls of vitrified material, and having on at least one surface a continuous surface film of vitrified material of pebbled or recurrently protuberant configuration.

4. As a new article of manufacture, a building unit of cellular vitrified argillaceous material of substantially uniform composition throughout and of predetermined shape and dimensions, and characterized by the inclusion throughout its body of separate and closed cells separated by cell walls of vitrified material, and having in its unit form a density of less than one-half the density of the argillaceous material entering into its formation.

5. As a new article of manufacture, a building unit of cellular vitrified argillaceous material, and characterized by the inclusion throughout its body of cells separated by cell walls of vitrified material, and having on at least one surface a continuous surface film of vitrified material of pebbled or recurrently protuberant configuration, and having in its unit form a density of less than one-half the density of the argillaceous material entering into its formation.

6. A building unit in the form of a slab of indefinite length and of substantially uniform width and thickness and composed of cellular vitrified argillaceous material of substantially uniform composition throughout and of predetermined shape and dimensions, and characterized by the inclusion throughout its body of cells separated by cell walls of separate and closed vitrified material.

7. A building unit in the form of a slab of indefinite length and of substantially uniform width and thickness and composed of cellular vitrified argillaceous material of substantially uniform composition throughout and of predetermined shape and dimensions, and characterized by the inclusion throughout its body of separate and closed cells separated by cell walls of vitrified material, and having in its slab form a density of less than one-half the density of the argillaceous material entering into its formation.

In witness that I claim the foregoing I have hereunto subscribed my name this 23rd day of July, 1929.

KEMPER SLIDELL.